United States Patent Office 2,703,598
Patented Mar. 8, 1955

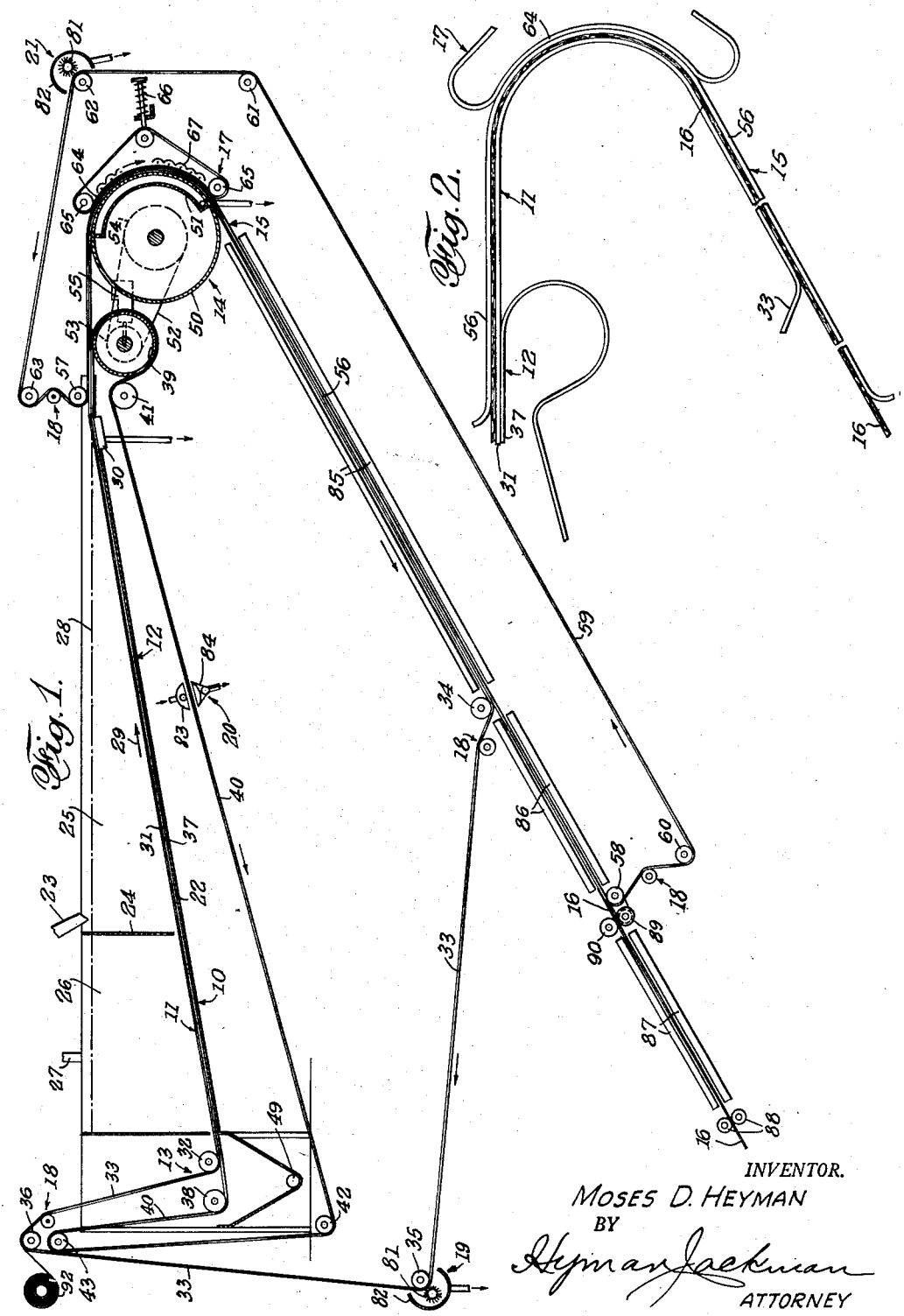

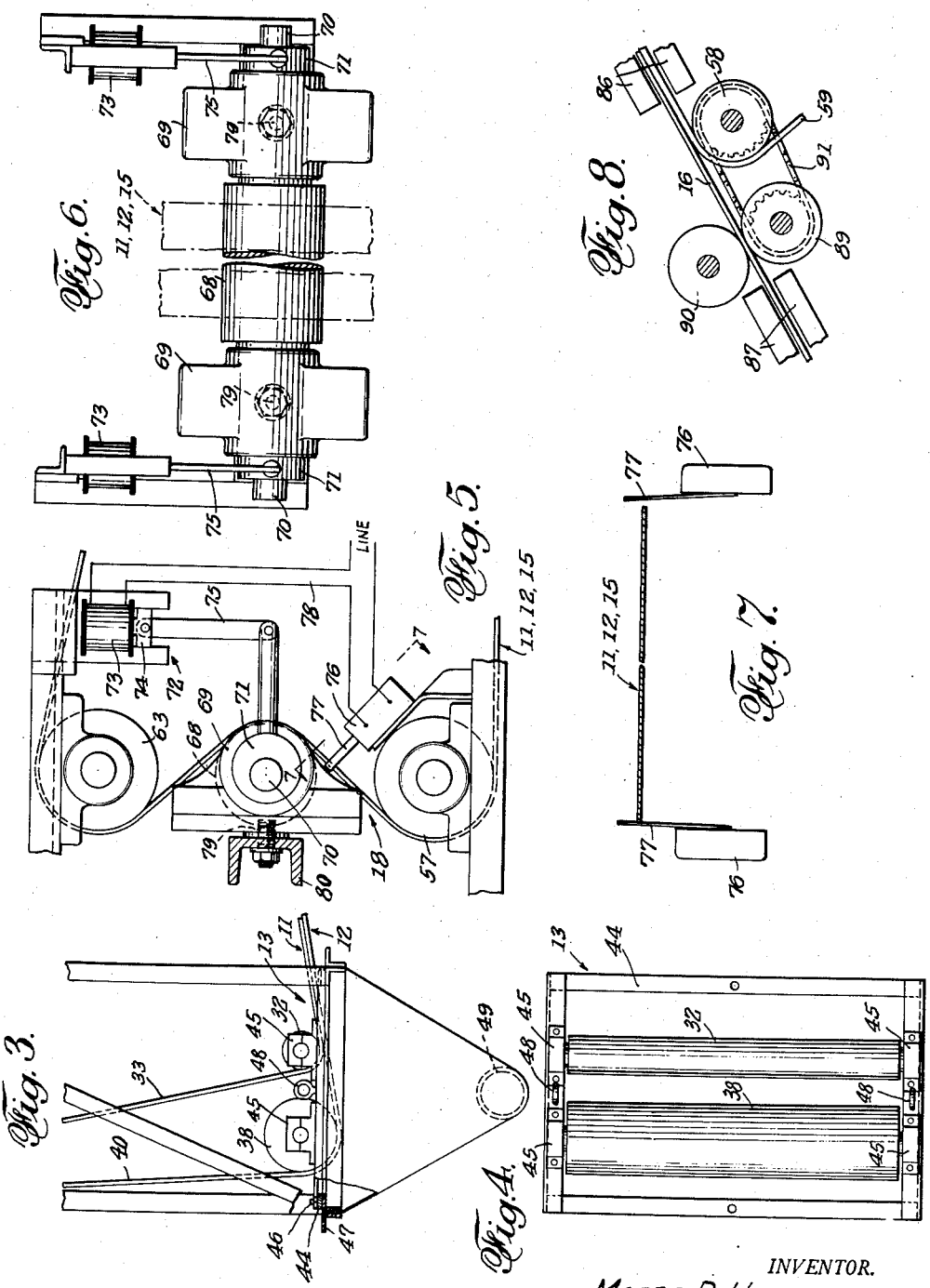

2,703,598

MICA SHEETING APPARATUS

Moses D. Heyman, Woodmere, N. Y., assignor to Integrated Mica Corp., Woodmere, N. Y., a corporation of New York Application August 5, 1952, Serial No. 302,701

9 Claims. (Cl. 154—2.5)

This invention relates to apparatus for forming an integrated sheet of fine mica splittings or flakes. This application is a continuation-in-part of my pending application, Ser. No. 201,020, filed December 15, 1950, and issued as United States Pat. No. 2,659,412 on November 17, 1953.

In the formation of a continuous sheet of integrated mica, certain problems arise. Between the stage where the mica flakes are deposited on a liquid-pervious web while the latter is being moved through a sheeter or depositing tank and the stage where the sheet has become thoroughly integrated, there are intermediate stages where the sheet has little strength and must be treated carefully to obviate disruption. Also, the webs or belts that serve to convey the sheet, during its forming stages, tend to become clogged by extremely fine flakes so that their pervious nature is impaired resulting in reduction of their efficiency. Further, any tendency toward lateral displacement of the webs or belts subjects the sheet being formed to torsional disrupting forces that impair the quality of the product. Again, because the different webs and belts expand and contract differently when immersed in liquid and when dry, their synchronous movement tends to become slightly displaced resulting in wrinkles forming in the mica sheet.

In order that a sheet of integrated mica be flat, smooth, uniform in its thickness and texture, and uniformly strong, it is necessary to provide apparatus that will obviate the above-mentioned faults and disadvantages. Accordingly, it is an object of the present invention to provide mica-sheeting apparatus in which means are provided, in combination, to firmly, and without attrition, support and convey a mica sheet during its forming stages, retain the supporting and conveying means in exact alignment and against tendency toward lateral runoff, maintain the supporting and conveying means clear of clogging flakes of mica, compensate for different expansion and contraction of said supporting and conveying means, and provide for slight tension on the sheet during the final stages of formation to obviate the formation of wrinkles in the sheet.

When forming a continuous sheet of integrated mica, it has been found advantageous to deposit the flakes on one liquid-pervious web, to transfer the partially formed sheet onto another web, and to retain operative engagement of the two webs, with the sheet therebetween, during compression, heating and drying of the sheet. It is another object of the invention to provide such an arrangement of sheet-engaging webs to support, guide and transport a mica sheet during the period of its integration.

The foregoing and other objects, features and advantages of the invention will become more clearly evident as the following description of a preferred form of the invention progresses, said description having basis on the apparatus illustrated in the accompanying drawings.

In the drawings:

Fig. 1 is a semi-schematic longitudinal sectional view of mica-sheeting apparatus according to the present invention.

Fig. 2 is an enlarged fragmentary side view of sheet-conveying means shown in Fig. 1.

Fig. 3 is a similarly enlarged side view of conveyor support and guide means employed in the apparatus.

Fig. 4 is a top plan view thereof.

Fig. 5 is a fragmentary side view of means to retain the various belts or webs of the apparatus against lateral displacement or runoff.

Fig. 6 is a broken front view of a portion of the means shown in Fig. 5.

Fig. 7 is a broken sectional view as taken on line 7—7 of Fig. 5.

Fig. 8 is a fragmentary side view of means to impart tension or stretch force to the integrated sheet as the latter nears its completed state.

The present apparatus comprises, generally, a sheeter tank 10, a traveling web 11 moving through said tank and on the upper surface of which mica flakes floating in the liquid in said tank are deposited, a traveling supporting belt 12 for web 11, an adjustable roller unit 13 for one end of web 11 and belt 12, a vacuum unit 14 over which web 11 is trained, a transporting conveyor belt 15, partly coextensive with web 11, also trained over vacuum unit 14, said web and the belt 15 confining between them an integrated sheet 16 comprised of the mica flakes initially deposited on web 11, a pressure device 17 cooperating with the vacuum unit 14 to integrate the mica flakes comprising sheet 16, means 18 provided for web 11 and belts 12 and 15 to hold the same in true alignment, means 19 for cleaning web 11 of fine mica flakes, means 20 for cleansing belt 12 of similar flakes, and means 21, similar to means 19, for cleansing belt 15.

The sheeter tank 10 comprises an elongated receptacle provided with a sloping bottom 22. Said tank receives a continuous flow of liquid-borne mica flakes by way of a chute 23 and also receives a flow of liquid-borne flakes that comprise a re-circulation of the overflow from tank 10. A partition 24 divides said tank into a compartment 25, that receives the original flow of flakes from chute 23, and a compartment 26 that receives the finer flakes that are included in said overflow and are discharged by way of a chute 27.

The dot-dash line 28 represents the level of liquid maintained in tank 10 and it will be realized that the flakes settle down through said liquid as web 11 is moved, in the direction of arrow 29, in an upwardly sloping direction adjacent tank bottom 22. In this manner, the finer flakes in compartment 26 settle on web 11 first and then the larger flakes in compartment 25 settle on said finer flakes, as the web is moved continuously through the tank.

The web 11 is liquid-pervious and, in practice, comprises a thin woven web of nylon fabric. This type of fabric is preferred because it has low absorptive properties as compared to other fabrics and also because practice has shown that mica flakes adhere better to nylon than, for instance, to metal. As more fully disclosed in said pending application, a vacuum plate or chest 30 creates a suction through the web 11 and on the flakes thereon at the point where the same breaks through the surface of the liquid level 28. This suction prevents washback of the flakes as the web moves upwardly out of the tank.

As shown, web 11 has a run 31 that extends between a roller 32 in the low forward part of the tank 10 and unit 14 and on which the mica flakes are deposited, and a return run 33 that is trained over rollers 34, 35 and 36. Thus, said web 11 is endless and returns to tank 10 after leaving the same beyond the discharge end where vacuum plate 30 is located.

The supporting belt 12 serves primarily as a moving table for web 11 and is preferably made as a closely woven yet liquid-pervious metal mesh. Stainless steel is preferred for this belt. As shown, the same has a web-supporting run 37 that extends between a roller 38 in the low forward part of tank 10 and a drive pulley 39 beyond the exit end of said tank, and a return run 40 that is trained over rollers 41, 42 and 43. It will be seen that belt 12 is also endless and loses support contact with web 11 after it has served its supporting purpose while in tank 10.

It will be seen from Fig. 1 that rollers 32 and 38 are in the path of downward flow of liquid and flakes from the bottom of tank 10 and, therefore, tend to become coated with flakes. This coating of flakes disturbs the true in-line movement of web 11 and belt 12 because the same builds up unevenly on the surfaces of said rollers. Accordingly, said rollers are mounted for simultaneous removal so that their relative adjustment will not be disturbed and their cleaning facilitated.

As shown in Figs. 3 and 4, the means 13 is provided for this purpose and comprises a rigid frame 44 that mounts rollers 32 and 38 in bearings 45 that are adapted to be adjusted so as to line up said rollers. Said frame is fixedly yet removably held by stud and nut means 46 that locks said frame to a support frame 47 at the end of tank 10. Eyes 48 are provided on the opposite ends of frame 44 and are adapted to be engaged by suitable hook-ended tools which are used to lift the latter frame and the rollers 32 and 38 thereon bodily out of the tank. This simple means 13 saves much time, particularly when frequent cleansing of rollers 32 and 38 is necessary. Below frame 44, an outlet 49 is provided for accumulations of flakes that may settle from tank 10.

The vacuum unit 14 comprises a perforated drum 50 around which the web 11 is trained and in the interior of which is provided a vacuum chest 51 that creates an inward suction through the perforations of the drum.

Pulley 39 and drum 50 are connected by a pulley and belt or chain drive 52 in which pulleys 53 and 54 are proportioned to effect a driving rotation of said pulley 39 and drum 50 that will provide equal linear travel of web 11 and belt 12. A suitable reduction gear drive unit 55 is employed to drive pulley 39 and the same may embody adjustability of driving speed so that regulation of the speed of travel of the web and of belt 12 may be made according to the desired thickness of deposit of flakes on said web. The mentioned pending application shows a comparable regulatable drive means.

The transporting conveyor belt 15 comprises an endless mesh belt that may be nylon or metal, as desired. Between vacuum plate 30 and pulley 39, said belt 15 is coextensive with belt 12 and is superimposed over web 11. Belt 15 is coextensive with said web as it passes over drum 50 and accompanies the web until the latter leaves contact by way of roller 34. This run 56 of belt 15 extends between rollers 57 and 58. The return run 59 is trained over rollers 60, 61, 62 and 63.

From the foregoing, it will be seen that the mica flakes deposited on web 11, as the same leaves tank 10, are sandwiched between said web and the run 56 of belt 15. Since web 11 and belts 12 and 15 should be maintained taut enough to obviate flexure thereof, rollers 35, 42 and 60 are preferably mounted on tensioning means of any conventional form.

From the above-described arrangement of the web and belts, it will be seen that, whereas the sheet 16 is first supported by web 11, after the sheet has passed over drum 50, it is supported by run 56 of belt 15. It will be noted that said run 56 is disposed at a downward angle so that gravity may aid the sheet 16 to travel downward on said run 56 after the return run 33 of web 11 leaves the same and even under conditions where said run 33 may slightly shrink because of moisture drying out therefrom. At this stage, run 33 does not exert a strong pressure on the mica sheet 16. Therefore, any relative movement of web 11, while shrinking, serves rather to subject said sheet to an ironing action and not to a disrupting force that may tend to separate the flakes comprising the sheet. The angle at which run 56 is disposed is such as to provide good support of the mica sheet during the period of its integration.

The pressure device 17 comprises a closely woven stainless steel belt 64 or a belt formed of other non-corrosive material. This belt is trained over pulleys 65 and is maintained taut and in firm engagement with run 56 of belt 15 by a spring tension means 66. As can be seen in Fig. 2, the mica sheet 16 is tightly squeezed between web 11 and belt 15 by the pressure force created by device 17, resulting in dislodgement of moisture from said sheet and an increase of the density thereof. This action combines with the suction applied through chest 51 to remove the major portion of the moisture from the mica sheet.

Since evaporation will greatly increase release of such moisture, metallic belt 64 may be heated as by reflector heaters 67 to increase moisture evaporation as the mica sheet moves over drum 50. While not shown, suitable thermo-couple means may be employed to cut said heaters in and out of operation to maintain the temperature of belt 64 substantially uniform and to obviate the possibility of scorching nylon web 11.

Because web 11 and belts 12 and 15 have numerous interstices, fine flakes of mica may clog said interstices and otherwise collect thereon. Clogging of said web and belts will lessen their efficiency as pervious members. Also, regardless of initial true alignment of the rollers and pulleys over which said web and belts are trained, build up of flakes on the latter causes them to become laterally displaced on the rollers and pulleys. Such lateral displacement or runoff would subject the mica sheet to attrition that tends toward de-lamination of the flakes comprising the sheet. To prevent such attrition, the web 11 and belts 12 and 15 are each provided with means 18 to maintain the same in true alignment. Such means, in greater detail, is shown in Figs. 5, 6 and 7.

The means 18 comprises a roller 68 over which web 11 or belts 12 and 15 are trained, end bearings 69 for engaging end trunnions 70 of said roller, eccentric bushings 71 in said bearings and in which said trunnions are fitted, and means 72, connected to each eccentric bushing, for effecting partial rotation of one or the other bushing to cause the axis of roller 68 to shift angularly.

Each means 72 comprises a solenoid 73 having a floating core 74, an articulated connection 75 between said core and eccentric bushing 71, and a microswitch 76 having a sensitive switch arm 77 positioned to be engaged by a lateral edge of web 11, or belts 12 or 15, as the case may be. A suitable electric circuit 78 interconnects said solenoid and microswitch, and the arms 77 of the latter, on opposite edges of web or belt, are so spaced as to be clear of the sheet edges when the same are in proper alignment.

Should the web or one of the belts run off laterally, the switch arm 77 on the side toward which the web or belts run off will be actuated to close switch 76, energize solenoid 73, and cause core 74 to move and effect a slight rotation of eccentric bushing 71, thereby displacing one trunnion 70 relative to the opposite trunnion and temporarily changing the line of axis of roller 68. The lateral runoff will not only be arrested but will be corrected to return the web or belt to a central position on said roller. Thus, between the switch arms 77 on opposite sides, the web or belts are each maintained in proper alignment and the mica sheet is retained straight as it passes through the apparatus.

To obviate binding on bearings 69, the latter are mounted on pivot studs 79 carried by a mounting member 80. Therefore, said bearings are free to rotationally adjust themselves and remain aligned according to any change of angle of the axis of roller 68.

The means 19 and 21 are substantially alike. Each comprises a rotating brush 81 that brushes from web 11 or from belt 15, as the case may be, such flakes that may cling thereto. A hood 82 encloses each brush 81. By applying vacuum to said hoods, the dislodged flakes are drawn out of the hoods.

The means 20 for ridding belt 12 of flakes comprises a device 83 on one side for blowing air through said belt, and a receptacle 84 on the opposite side to receive the flakes thus dislodged. Suction on said receptacle removes said flakes.

After the sheet of mica 16 leaves means 14 and while said sheet is still sandwiched between web 11 and belt 15, heat is applied thereto by heaters 85 to remove residual moisture in said sheet. At this stage, the sheet has become quite thoroughly integrated. Additional heaters 86 still further dry the sheet as the same is moved between rollers 34 and 58 and while only supported by belt 15. Beyond roller 58, the sheet is unsupported and requires no support because it is now fully integrated. Additional drying, if the same is deemed necessary, may be effected by heaters 87 located between rollers 58 and a set of rollers 88 that have the primary function of holding the sheet straight as the same leaves the apparatus.

Any tendency for the sheet 16 to wrinkle up after leaving belt 15 is counteracted by a pair of rollers 89 and 90 between which the sheet passes. By driving roller 89 slightly faster than roller 58, the sheet is tautened during the period of heating by heaters 85 and 86 and wrinkles, if any form in the sheet, are smoothed out. Roller 90 serves only as a traction idler roller and exerts very little pressure on the sheet. Only roller 89 of the pair is driven and, by means of chain drive 91 or any similar drive, is rotated slightly faster than roller 58.

It will be seen from the foregoing that the various instrumentalities of the apparatus combine to retain proper alignment and tension on the sheet during its integration; that de-lamination of the sheet is obviated; and that uniformity of texture, density and strength of the sheet results from the combined means herein disclosed.

It is sometimes desired to provide a paper or other backing for sheet 16. To this end, a roll 92 of such backing material may be provided and fed onto web 11 before said web enters tank 10. It will be clear that the mica flakes will be deposited on such backing instead of directly on web 11. The apparatus otherwise functions as before described and the resulting product is a paper-backed mica sheet.

While I have disclosed what I now regard as the preferred form of my invention, the construction is, of course, subject to modification within the spirit and scope of my invention. Therefore, I desire to reserve to myself such modifications that may fall within the spirit and scope of the appended claims.

Having thus described my invention, what I claim and desire to obtain by Letters Patent, is:

1. Mica sheeting apparatus comprising an elongated tank into which a continuous flow of liquid-borne mica flakes is introduced, a thin liquid-pervious non-metallic web moving longitudinally through said tank and the liquid therein and outward beyond one end of the tank and on the upper surface of which the flakes in the liquid within the tank settle down and form a layer of flakes, a metallic, liquid-pervious and relatively thicker support belt having a run disposed in the tank and on which the thin web is supported while moving through the tank, a transporting belt beyond said end of the tank and superimposed over the deposited layer of flakes on the web and moving together with the web to hold said layer of flakes sandwiched between itself and the web, a perforated drum over which the web, belt and layer of flakes are trained and to the interior of which suction is applied to extract moisture from said layer, and heating means applied to the web, belt and layer of flakes, after the same pass over the drum, to evaporate residual moisture from said layer to integrate the flakes thereof into a sheet.

2. Mica sheeting apparatus according to claim 1: means to apply pressure against the web, belt and layer of flakes while the same are trained over the perforated drum.

3. Mica sheeting apparatus according to claim 1: means to apply pressure against the web, belt and layer of flakes while the same are trained over the perforated drum, said means comprising an endless metallic belt having a tautened run urged against and moving together with the web, transporting belt and layer of flakes.

4. Mica sheeting apparatus according to claim 1: means to apply pressure against said web, belt and layer of flakes while the same are trained over the perforated drum, said means comprising an endless metallic belt having a tautened run urged against and moving together with the web, transporting belt and layer of flakes, and means to apply controlled heat to said endless metallic belt while the suction is being applied.

5. In mica sheeting apparatus having an elongated tank into which a continuous flow of liquid-borne mica flakes is introduced, a thin liquid-pervious and endless web having a run thereof moving angularly upward within the tank and the liquid therein and then outward beyond an end of the tank, said web being adapted to receive on its upper surface a layer of mica flakes settling downwardly in the liquid in the tank, a liquid-pervious support belt having a run substantially coincidental with the mentioned run of the web and supporting the latter run during movement through and outward from the tank, a driving drum beyond said end of the tank over which said web is trained and a pulley driven by the driving drum and located between said drum and said end of the tank and over which the support belt is trained, said web having a downwardly angled run beyond its engagement with said drum, and an endless transporting belt moving at the same linear speed as the web and superimposed over the layer of flakes on said surface of the web and having a run coextensive with that portion of the web that extends between the tank and the drum, that is trained over the drum, and that comprises the downwardly angled run, said run of the belt sandwiching the layer of mica flakes between itself and the web, whereby the layer of flakes initially deposited on the web rests upon the mentioned angled portion of the belt after passing over the drum.

6. In a mica sheeting apparatus according to claim 5: the belt having a portion extending angularly downward beyond the angularly extending portion of the web and having the layer of flakes disposed on the upper surface thereof, means to integrate the flakes of said layer into a sheet and operatively engaged with the mentioned coextensive portions of the web and belt, and means to move and apply wrinkle-counteracting tension on the integrated sheet beyond said angularly downwardly extending portion of the belt.

7. Mica sheeting apparatus comprising an elongated tank having a sloping bottom and shallower at one end than at the other, an endless liquid-pervious web having a run thereof disposed within and adjacent to the tank bottom and the remainder of the web encircling the outside of the tank and, in part, disposed beneath the tank, a liquid-pervious and endless support belt having a run on which the run of the web is supported, means to move both the web and the belt in a direction that moves the same outward from the shallow end of the tank to move out of the tank a layer of mica flakes that settle downwardly on the run from mica-laden liquid in the tank and through which said run moves, a portion of said remainder of the web being disposed at a downward slope and moving in a direction opposite to the direction of movement of the run, and a transporting belt moving together with the web and having a portion coextensive with the upper part of the sloping portion of the web and therebeneath, the layer of flakes formed on the run of the web in the tank and transported from the shallow end of the tank being sandwiched between said sloping portions of the web and belt and transposed from the web to the belt during such sandwiching engagement.

8. Mica sheeting apparatus comprising an elongated tank into which a continuous flow of liquid-borne mica flakes is introduced, an endless and liquid-pervious support belt having a web-supporting run disposed adjacent the bottom of said tank and moving longitudinally through the liquid in the tank, a liquid-pervious web having a run positioned on and supported by the mentioned run of the support belt, said latter run constituting a moving support table for the run of the web on the upper surface of which the flakes in the liquid within the tank are adapted to settle and form a layer of mica flakes, said runs of the belt and web moving out of the tank together, a transporting belt beyond said end of the tank and superimposed over the deposited layer of flakes on the web and moving together with the web to hold said layer of flakes sandwiched between itself and the web, the end of the run of the support belt overlapping a portion of the transporting belt and confining therebetween the flake-carrying web, and suction and heating means beyond the end of said run of the support belt and effective on the web, transporting belt and layer of flakes, while the same move together, to extract moisture from said layer to integrate the flakes of said layer into a sheet.

9. Mica sheeting apparatus according to claim 8: means to retain the web and belts in longitudinal alignment to obviate attrition of the web and belts on the layer of flakes to, thereby, retain the deposited position of the flakes and in which position the flakes are integrated upon the mentioned extraction of moisture.

References Cited in the file of this patent

UNITED STATES PATENTS

| | | |
|---|---|---|
| 940,188 | Peterson | Nov. 16, 1909 |
| 1,305,848 | Weinheim | June 3, 1919 |
| 1,754,370 | Raynes | Apr. 15, 1930 |
| 1,830,522 | Cooper | Nov. 3, 1931 |
| 1,913,875 | Frederick | June 13, 1933 |
| 1,927,361 | Edge | Sept. 19, 1933 |
| 1,950,089 | Morse | Mar. 6, 1934 |
| 2,481,949 | Richardson | Sept. 13, 1949 |
| 2,641,416 | McCleary et al. | June 9, 1953 |
| 2,659,412 | Heyman | Nov. 17, 1953 |

FOREIGN PATENTS

| | | |
|---|---|---|
| 102,798 | Sweden | Oct. 14, 1941 |
| 102,799 | Sweden | Oct. 14, 1941 |